United States Patent [19]

Bartlett et al.

[11] 4,180,745
[45] Dec. 25, 1979

[54] POWER REGULATING SUPPLY SYSTEM FOR AC ELECTRICAL LOADS

[76] Inventors: Frank Bartlett, 4815 E. Platte, Colorado Springs, Colo. 80916; Allen R. Franks, P.O. Box 1552, Rockport, Tex. 78382

[21] Appl. No.: 843,572

[22] Filed: Oct. 19, 1977

[51] Int. Cl.² ................................................ H02J 3/46
[52] U.S. Cl. ........................................ 307/45; 307/64; 307/87; 307/76
[58] Field of Search ................. 307/45, 72, 76, 82, 307/84, 87, 18, 22, 25, 26, 44, 64, 51, 52, 252 B, 252 N; 363/74, 76, 78, 109

[56] References Cited
U.S. PATENT DOCUMENTS

| 2,644,128 | 6/1953 | Henrich | 323/45 |
| 3,771,012 | 11/1973 | Niederjohn | 307/64 |
| 3,927,345 | 12/1975 | Licata | 307/252 N |
| 3,946,242 | 3/1976 | Wilkerson | 307/45 |
| 4,038,559 | 7/1977 | Chun | 307/51 |
| 4,087,697 | 5/1978 | Johnson | 307/252 B |

Primary Examiner—L. T. Hix
Assistant Examiner—S. D. Schreyer
Attorney, Agent, or Firm—Jacob Shuster

[57] ABSTRACT

Electrical line voltage energy from an AC power network is combined with the energy derived from an auxiliary DC voltage source through the primary winding of a transformer to operate an AC load under rated conditions normally associated with its operation by the AC power network alone. The DC voltage is converted to a form compatible with said rated operation of the load under control of AC signals sampled from the AC power network. Line voltage from the AC power network to the transformer primary is blocked when sufficient energy is available from the DC voltage source alone to operate the load.

9 Claims, 4 Drawing Figures

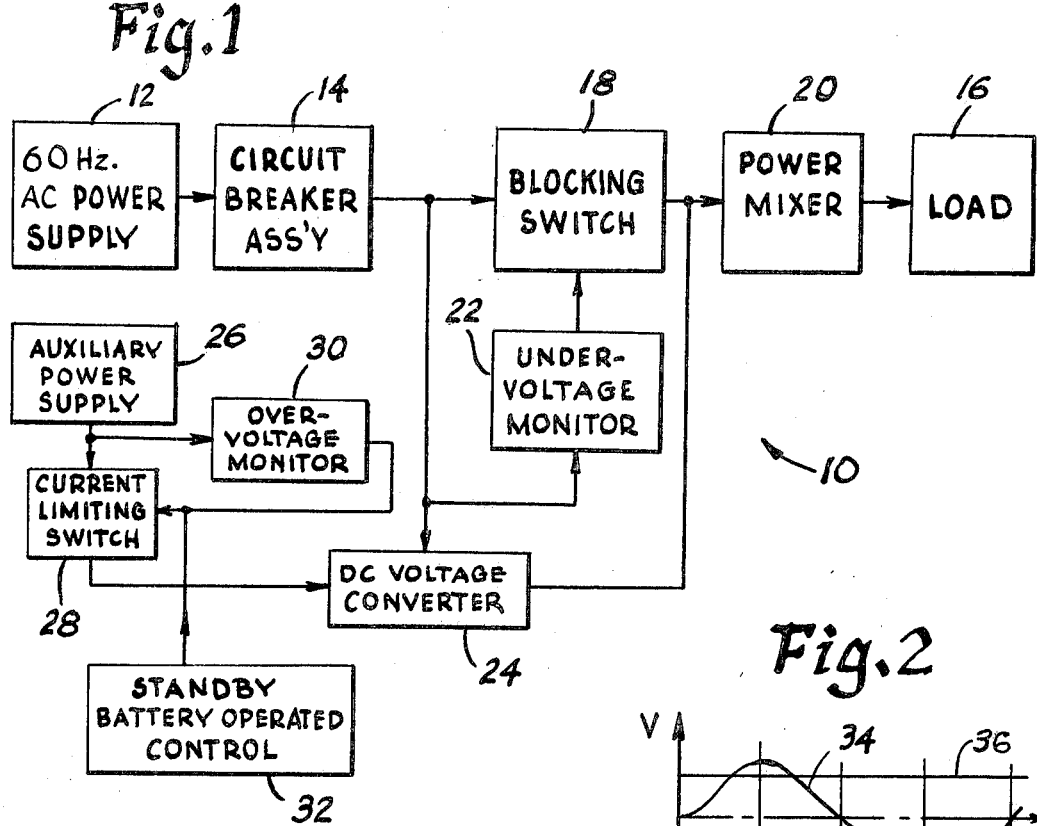
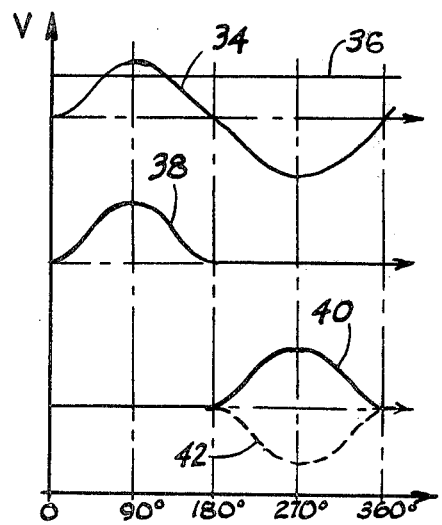
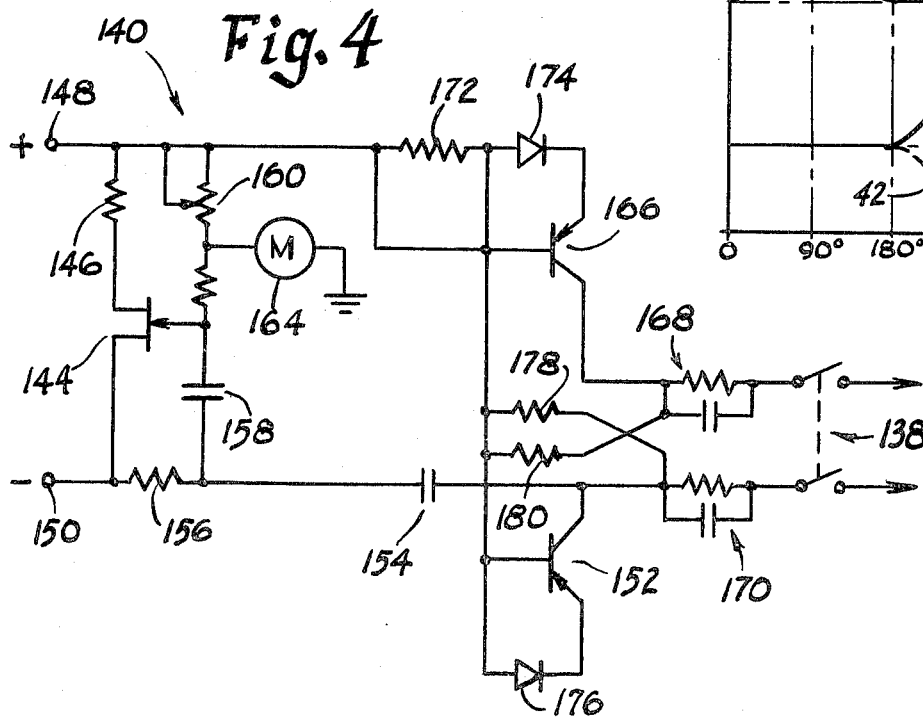

POWER REGULATING SUPPLY SYSTEM FOR AC ELECTRICAL LOADS

BACKGROUND OF THE INVENTION

This invention relates to the supply of electrical energy to AC loads from auxiliary power sources in a manner compatible with operation of the load by the energy normally available from an AC power distribution network.

The use of geophysical power sources typified by solar, wind and water turbines driving DC generators to augment the electrical power normally supplied from an AC distribution network by a power utility, is already well known. Such arrangements are presently being given more serious attention because of the rising costs of generating electrical energy and the growing concern with our inability to meet rising energy demands.

Utilization of energy having unipolarity voltage characteristics derived from auxiliary electrical power sources as aforementioned to operate an AC load that is otherwise operated by AC line voltage from a power distribution network, is disclosed in U.S. Pat. No. 3,946,242 to Wilkerson. According to the Wilkerson patent, the AC load is directly and continuously connected to the AC power mains in parallel with the output terminals of a thyristor bridge under control of switching circuits to which AC signals are supplied from the power mains so as to impart suitable voltage and frequency characteristics to the DC voltage energy at the output terminals of the bridge. Thus, according to the Wilkerson patent, energy to operate the AC load is continuously supplied from the AC power distribution network and only intermittently supplied from the DC voltage source through a logic controlled switching system. Such a power regulating system does not take into account the varying demand of the load nor regulate the relative amounts of energy consumed from the two energy sources to make full use of the energy available from the auxiliary DC voltage source.

It is, therefore, an important object of the present invention to provide a new and useful power regulating supply system for operating AC loads which will more effectively utilize the energy available from the auxiliary power source as well as to effect a greater savings in the amount of energy consumed from the AC power distribution network.

PRIOR ART STATEMENT

The Wilkerson patent aforementioned is the only specific and relevant prior art of which applicant is presently aware.

SUMMARY OF THE INVENTION

In accordance with the present invention, the AC power lines of a distribution network are coupled through signal controlled switch devices, such as gated triacs, to the primary winding of a power transformer, the secondary winding of which is connected to the AC load. The supply of power from the AC power distribution network to the transformer is thereby blocked when the line voltage reflecting the load demand is above a predetermined undervoltage value. Electrical power is then supplied to the transformer primary winding only from an auxiliary DC voltage source after being transformed for operation of the AC load under rated conditions normally associated with the characteristics of the AC power distribution network. The DC voltage is, therefore, converted into a form having the proper frequency and phase relationship by means of a signal controlled converter which samples the phase currents in the AC power lines for that purpose. An overvoltage sensing circuit is operative through a current limiting switch to prevent supply of excessive current from the auxiliary power source to the signal controlled converter.

In the event there is an AC power failure, and no AC input signal is therefore available for current shaping purposes in the converter, a standby battery operated pulse generator is switched on to control the supply of current to the converter through the current limiting switch at a pulsating frequency equal to that of the AC power supply in order to continue operation of the load under substantially rated conditions.

BRIEF DESCRIPTION OF THE DRAWING FIGURES

The invention both as to its arrangement and method of operation, together with additional objects and advantages thereof, will be best understood from the following description of a specific embodiment when read in connection with the accompanying drawings, in which:

FIG. 1 is a schematic block diagram illustrating the system of the present invention.

FIG. 2 is a graphical illustration showing some of the voltage characteristics associated with the system depicted in FIG. 1.

FIG. 4 is an electrical circuit diagram of the pulse generator schematically shown in FIG. 3.

DETAILED DESCRIPTION OF PREFERRED EMBODIMENT

Figure 3:
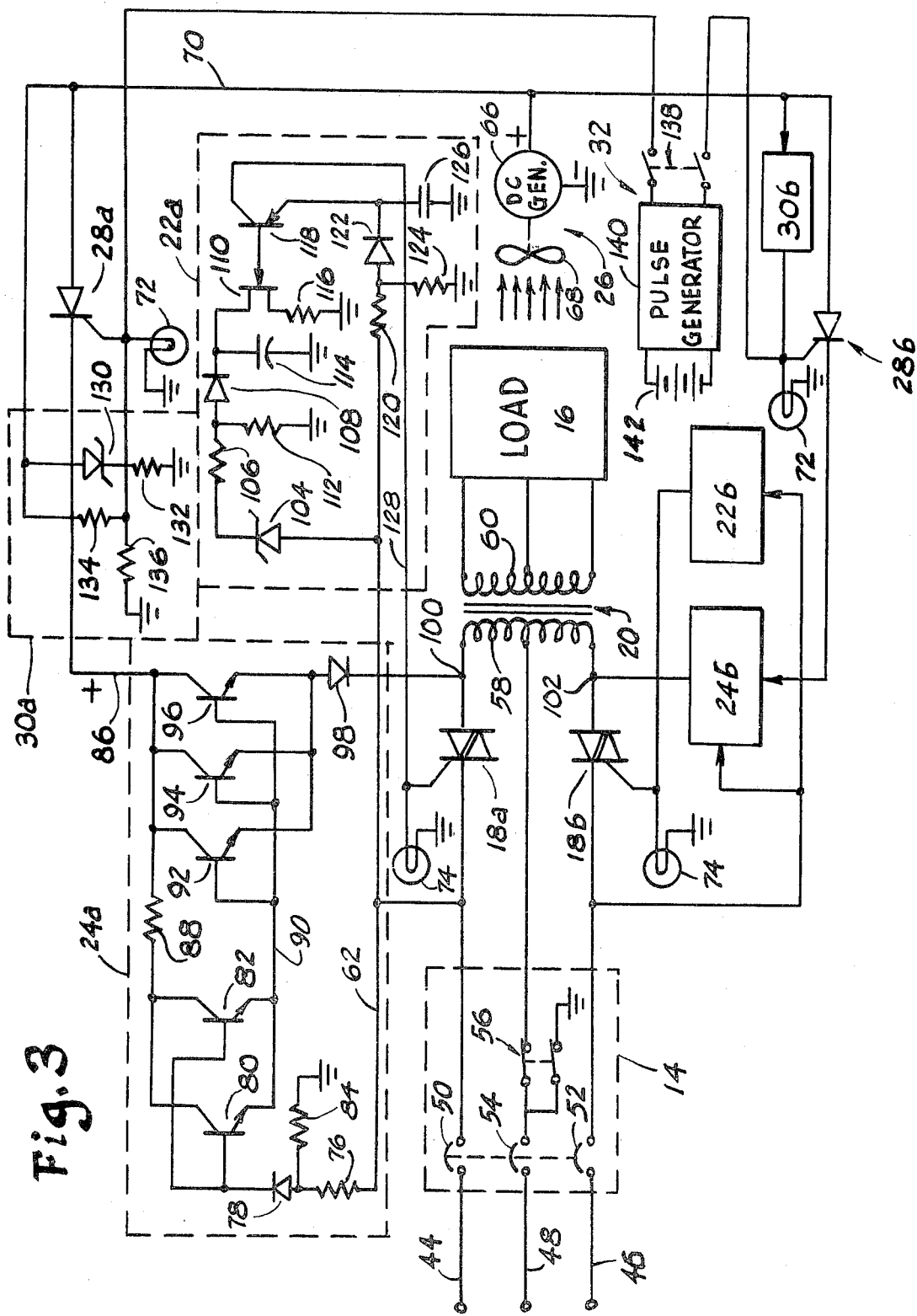
FIG. 3 is an electrical circuit diagram corresponding to the system as depicted in FIG. 1.

Referring now to the drawings in detail, FIG. 1 schematically depicts the power regulating system of the present invention generally denoted by reference numeral 10 adapted to be coupled to the AC power lines of the usual power distribution network or power supply 12 supplying, for example, electrical energy at 60 Hz. and 110 VAC to AC loads through a circuit breaker assembly 14. In accordance with the present invention, the AC load 16 as depicted in FIG. 1, is coupled to the AC power supply 12 through a blocking switch component 18 and a power mixer component 12. The blocking switch 18 is operative to normally block the supply of current to the power mixer when the line voltage is above a predetermined undervoltage value as detected by an undervoltage monitor component 22. With AC line voltage from the AC power supply blocked, energy is supplied to the load 16 through the power mixer 20 from a signal controlled converter 24 deriving its electrical energy from an auxiliary power supply 26. The auxiliary power supply feeds DC voltage current when available through a current limiting switch 28 to the converter 24, the DC voltage being transformed under control an AC signal sampled from the power lines in order to supply energy in proper form, as to frequency and phase, to the power mixer 20 for operation of the load. An overvoltage monitor 30 senses the DC voltage from the auxiliary source 26 in order to limit the magnitude of the voltage applied to the converter 24. Thus, when sufficient energy is available from the auxiliary power supply 26 alone in order to meet the demands of the load 16, so that full AC line voltage is detected by the undervoltage monitor 22 in order to block consumption of electrical energy from the AC power supply 12 the AC line voltage then only is sampled to impart the AC line voltage characteristics to the converter 24 for transformation of the DC voltage from the auxiliary power supply as aforementioned. When the auxiliary power supply 26 is unable to supply all of the load demand, energy derived from both the AC power supply 12 and from the auxiliary power supply 26 is combined within the power mixer 20 to operate the AC load 16. The AC load demand will determine the relative amounts of electrical energy consumed from the two power supplies 12 and 26.

A standby battery operated control 32 is provided as depicted in FIG. 1 and connected through a current limiting switch 28 to the converter 24 for controlling the supply of energy derived from the DC power supply 26 alone at the proper frequency to operate the load under substantially rated conditions even though no AC signal is available from the AC power lines to control operation of the converter 24.

As shown in FIG. 2, a sinusoidal voltage curve 34 depicts the energy characteristics of the line voltage in the AC power lines associated with the AC power supply 12 aforementioned. The DC voltage energy characteristic is depicted by the straight curve 36. This DC voltage is transformed into rectified and wave shaped voltage curves 38 and 40 of the same frequency and in phase with the sinusoidal voltage curve 34. When applied to the power mixer 20, the voltage curve 40 is inverted as indicated by dotted line 42 and combined with the curve 38 to produce a resultant sinusoidal voltage characteristic suitable for operation of the AC load 16.

Referring now to the circuit diagram illustrated in FIG. 3, two AC power phase lines 44 and 46 are shown connected to the AC power distributing network from which a common ground line 48 also extends. 110 VAC power at 60 Hz is available, for example, across the power lines 44 and 46. Overcurrent protection is provided by the circuit breaker assembly 14 which includes the interconnected circuit breaker sections 50 and 52 for the power phase lines and 54 for the common line 48. A ground circuit breaker 56 is also provided for the common line. The lines extending from the circuit breaker assembly in accordance with the present invention are coupled by triacs 18a and 18b, forming the blocking switch component 18 aforementioned, to a primary winding 58 of a load transformer constituting the power mixer component 20 aforementioned. The output terminals and center tap of the secondary winding 60 associated with the transformer 20 are connected to the AC load 16. The triacs 18a and 18b normally block the supply of phase current from the power lines 44 and 46 to the transformer but are switched to a conductive state in response to an undervoltage condition in the power lines as detected by the undervoltage sensor circuits 22a and 22b respectively connected to the power phase lines through AC signal lines 62 and 64. The AC signal from the power lines is also fed through the signal lines 62 and 64 to the converter circuit sections 24a and 24b of the converter 24. DC voltage power is supplied to each of the converter circuit sections 24a and 24b through the current limiting switch 28 in the form of silicone control rectifiers 28a and 28b having anodes connected in parallel by DC voltage line 70 to the positive output terminal of a DC generator 66 associated with the auxiliary power supply. The generator 66 may, for example, be driven by a wind turbine 68 as diagrammatically shown in FIG. 3. A gating signal supplied to the gate electrodes of the SCR's 28a and 28b normally maintains them in a conductive state for applying a positive DC voltage to the converter circuit sections 24a and 24b. The gate electrodes receive signals from the circuit sections 30a and 30b of the overvoltage monitor 30 connected to the AC voltage line 70 in parallel with the SCR's in order to sense an overvoltage condition causing the SCR's to switch off. The conductive state of the SCR's 28a and 28b is registered through indicator lamps 72 connected to the gate electrodes. Indicator lamps 74 are also connected to the gate electrodes associated with the triacs 18a and 18b in order to register the condition thereof. By means of the indicator lamps 72 and 74 one is able to determine the condition of the AC power and auxiliary power supplies.

The converter circuit sections 24a and 24b are similar in arrangement and operation. The converter circit section 24a, for example, includes a voltage reducing resistor 76 through which the AC signal in line 62 is sampled and conducted by diode 78 to the bases of a pair of parallel connected, signal transistors 80 and 82, the loading on the transistor bases being regulated by resistor 84. DC operating voltage is supplied to the collectors of the transistors 80 and 82 from the DC voltage supply line 86 through voltage dropping resistor 88. Accordingly, the output emitters of transistors 80 and 82 supply an AC controlled input signal through line 90 to the bases of three parallel connected amplifier transistors 92, 94 and 96 of the emitter follower type in a signal-controlled mode of operation. The DC voltage applied to the collectors of transistors 92, 94 and 96 of the converter is thereby transformed into a substantially sinusoidally shaped output proportional to and in phase with the AC input signal and fed through rectifying diode 98 to the transformer primary winding 58. The output of the converter circuit section 24a applied to the primary winding terminal 100 therefore corresponds to one half of a sine wave as depicted by curve 38 in FIG. 2 in phase with the AC voltage available in power line 44. Simultaneously, an in-phase half sine wave curve 40 as shown in FIG. 2 represents the phase current supplied by the converter circuit section 24b to the other terminal 102 of the primary winding 58 by virtue of which this phase current is inverted relative to the phase current supplied to the primary winding terminal 100 in order to produce a voltage across the primary winding terminals of sinusoidal shape for inducing a proper output current in the secondary winding 60 for operation of the AC load 16.

It will be apparent that while the DC voltage from the auxiliary power supply 26 is continuously applied to the load through the SCR's 28a and 28b and the converter sections 24a and 24b, the AC line voltage from the AC power supply 12 is intermittently applied to the load on demand through triacs 18a and 18b. and is only used continuously as a signal voltage for operation of the converter sections 24a and 24b in a signal controlled mode as hereinbefore described. The demand on the line voltage is determined from the relationship (RL) (VAC/VDC), where RL is the load impedance, VAC is the AC line voltage sampled by undervoltage monitor 22, the VDC is the DC voltage sampled by the overvoltage monitor 30.

The voltage monitor 22 includes the two sensing circuit sections 22a and 22b respectively connected to the signal lines 62 and 64 to sample the AC line voltage. A zener diode 104 in each sensing circuit establishes a threshold level for the signal voltage at which current is fed through a voltage reducing resistor 106 and diode 108 to the unijunction transistor 110 as a constant rectified DC control current regulated by resistor 112 and filtered by capacitor 114. A current path is thereby established by transistor 110 through load resistor 116 to produce a control voltage applied to the base of transistor 118 to which signal current from the signal line 62 is fed through voltage reducing resistor 120 and diode 122. The current level is set by resistor 124 and it is filtered by capacitor 126 to conduct a gating signal in line 128 when transistor 118 is turned on in response to detection of an undervoltage level in the AC signal line 62 being monitored. This gating signal will also be registered by indicator 74 to signify that AC line voltage from the AC power supply 12 is being consumed by the load.

The DC voltage in line 70 from the auxiliary power source 26 is monitored by each of the sensing circuits 30a and 30b which include a zener diode 130 connected to the line 70 to set the overvoltage level at which a shunt path is established through load resistor 132 in series with the zener diode. The shunt path so established reduces the gating potential applied through resistor 134 to the gate electrode of the SCR 28a at a level determined by resistor 136, to thereby switch off the SCR under overvoltage conditions. The indicator lamp 72 also connected to the gate electrode of the SCR will therefore signify the presence or absence of DC voltage in line 86.

The gate electrodes of the SCR's 28a and 28b may also receive gating signals at a pulsating frequency corresponding to that of the AC power supply 12 upon closure of the switch assembly 138 of the battery operated control component 32 when there is a power failure of the AC power supply 12. This pulsating gating signal will therefore open and close the SCR switches 28a and 28b to control the supply of DC voltage current from line 70 to line 86 at the load operating frequency from which the current is conducted through the converter sections 24a and 24b in a non-signal controlled mode of operation because of the absence of any AC signal. In such event, the transistors 80 and 82 are no longer operative to vary the base voltage in line 90 which then holds the bases of transistors 92, 94 and 96 at a forward bias level so that current may be conducted from line 86 to transformer 20 in the non-signal controlled mode. The pulsating gating signal controlling supply of current through SCR 28a or 28b is obtained from a pulse generator 140 energized by a standby battery 142.

As shown in FIG. 4, the pulse generator 140 includes a unijunction transistor 144 connected in series with a load resistor 146 across the battery terminals 148 and 150 to induce a pulse at the collector of transistor 152 through coupling capacitor 154. The pulse rate is set at 60 Hz by resistor 156 and capacitor 158. The battery voltage is set at the proper level by potentiometer 160 connected in series with voltage dividing resistor 162 to the control electrode of transistor 144. Meter 164 connected to the junction between resistors 160 and 162 visually indicates the battery adjustment level. The transistors 152 and 166 respectively conduct pulsating current in 180° out of phase relation to each other to the switch assembly 138 through RC bias networks 168 and 170 to control the pulse discharge rate in accordance with the power available from the auxiliary power supply 26. Current from the positive terminal 148 of the battery is conducted through the voltage reducing resistor 172 and the diodes 174 and 176 at the pulsating frequency established by the switching transistors 152 and 166, the loadings of which are balanced by resistors 178 and 180.

The foregoing is considered as illustrative only of the principles of the invention. Accordingly, all suitable modifications and equivalents may be resorted to, falling within the scope of the invention.

What is claimed is:

1. In combination with an AC power network adapted to apply AC line voltage to an AC load substantially at rated current and frequency, and an auxiliary power source independent of said AC power network from which a DC voltage is obtained, a power control system comprising converting means connected to the auxiliary power source for converting the DC voltage from the auxiliary source into a pulsating voltage at said rated frequency and in phase with the line voltage, power mixing means operatively coupling the AC power network and the converting means to the AC load for operation thereof by either or both of said AC line and pulsating voltages under rated conditions, switch means connecting the auxiliary power source to the converting means for supply of current thereto in a signal controlled mode of operation of the converting means, sensing means connected to the auxiliary power source for detecting an overvoltage condition of the DC voltage, and gate means connecting the sensing means to the switch means for opening thereof in response to said detection of the over-voltage condition.

2. The combination of claim 1 wherein said power mixing means includes a transformer having a secondary winding connected to the load and a primary winding having input terminals connected in parallel to the AC power network and the converting means.

3. The combination of claim 2 including current blocking means connected to the AC power network for normally preventing application of the AC line voltage to the power mixing means and voltage monitoring means for rendering the current blocking means conductive below a predetermined undervoltage condition of the load.

4. The combination of claim 3 including a source of standby storage energy, pulse generating means energized by said source of storage energy for producing a gating signal, and means connecting the pulse generating means to the gate means for selectively rendering the switch means operative in response to the gating signal to conduct current to the power mixing means during an uncontrolled mode of operation of the converting means.

5. The combination of claim 1 including a source of standby storage energy, pulse generating means energized by said source of storage energy for producing a gating signal, and means connecting the pulse generating means to the gate means for selectively rendering the switch means operative in response to the gating signal to conduct current to the power mixing means during uncontrolled mode of operatiion of the converting means.

6. The combination of claim 1 including current blocking means connected to the AC power network for normally preventing application of the line voltage to the power mixing means and voltage monitoring means for rendering the current blocking means conductive below a predetermined undervoltage condition of the load.

7. In combination with an AC power network adapted to apply line voltage to an AC load substantially at rated current and frequency, and an auxiliary power source from which a DC voltage is obtained, a power control system comprising means connected to the auxiliary power source for converting the DC voltage into a pulsating voltage at said rated frequency and in phase with the AC line voltage, a transformer connected to the load and the converting means, and voltage responsive control means electrically connecting the AC power network to the transformer in parallel with the converting means for supplying current to the transformer from each of the AC power network and the converting means as a function of the demand of the load, said voltage responsive control means including current blocking switch means for preventing supply of line voltage current from the AC power network to the transformer above a predetermined undervoltage while the load demand is met by the auxiliary power source alone through the converting means.

8. In combination with an AC power network adapted to apply line voltage to an AC load substantially at rated current and frequency, and an auxiliary power source from which a DC voltage is obtained, a power control system comprising means connected to the auxiliary power source for converting the DC voltage into a pulsating voltage at said rated frequency and in phase with the AC line voltage, a transformer connected to the load, and voltage responsive control means electrically connecting the AC power network and the converting means in parallel to the transformer for respectively supplying current to the transformer as a function of the demand of the load, the voltage responsive control means including current blocking means for preventing supply of line voltage current from the AC power network to the transformer above a predetermined undervoltage, and current limiting means for preventing supply of DC voltage current from the auxiliary power source to the voltage converting means above a predetermined overvoltage.

9. The combination of claim 8 wherein said DC voltage converting means includes phase current sampling means connected to the AC power network for producing control signals proportional to and in phase with said line voltage, DC current controlling means connected to said auxiliary power source for amplifying said control signals, and means connecting the DC current controlling means to the transformer in parallel with the AC power network for supply of the amplified signals thereto in phase with the line voltage.

* * * * *